United States Patent [19]
White

[11] Patent Number: 5,682,977
[45] Date of Patent: Nov. 4, 1997

[54] VERTICALLY ADJUSTABLE COVER FOR AN ELONGATED DEVICE AND ADJUSTMENT APPARATUS THEREFOR

[75] Inventor: Michael A. White, Chesapeake, Va.

[73] Assignee: Nabisco, Inc., Parsippany, N.J.

[21] Appl. No.: 539,460

[22] Filed: Oct. 5, 1995

[51] Int. Cl.$^6$ .................................................. B65G 21/20
[52] U.S. Cl. ............................ 198/860.5; 198/860.3; 198/836.1
[58] Field of Search ........................ 198/836.1, 836.2, 198/836.3, 860.3, 860.5

[56] References Cited

U.S. PATENT DOCUMENTS

| | | | |
|---|---|---|---|
| 1,929,707 | 10/1933 | Mojonnier | 198/836.3 |
| 5,161,678 | 11/1992 | Garvey | 198/860.5 X |
| 5,421,678 | 6/1995 | Aidlin et al. | 198/836.3 X |
| 5,551,555 | 9/1996 | Gladieux et al. | 198/836.3 |

OTHER PUBLICATIONS

Air Glide Inc. Conveyor Systems Informational Flyer.
Air Glide inc. Brochure.

*Primary Examiner*—James R. Bidwell

[57] ABSTRACT

The invention presented is an elongated device having an adjustable cover therefor. More particularly, the invention includes an elongated device having opposing vertical sides and a top portion; a mounting structure associated with the elongated device, for mounting a cover thereover, the mounting structure having a plurality of successively arrayed substantially vertical supports and a plurality of slidable mounts, each slidable mount being slidably positioned on one of the vertical supports; a cover attached to each of the slidable mounts so as to at least partially cover the top portion of the elongated device; a plurality of successively arrayed adjustment levers, each adjustment lever having two arms and a fulcrum point, a first arm of each of the adjustment levers being operatively connected to one of the slidable mounts and a second arm of each of the adjustment levers being operatively connected to the second arm of at least one successive adjustment lever, such that displacement of the second arm of one of the adjustment levers results in displacement of the second arm of at least one successive adjustment lever, and vertical displacement of the slidable mounts to which the adjustment levers are connected.

20 Claims, 4 Drawing Sheets

VERTICALLY ADJUSTABLE COVER FOR AN ELONGATED DEVICE AND ADJUSTMENT APPARATUS THEREFOR

TECHNICAL FIELD

The present invention relates to a vertically adjustable cover for an elongated device, as well as an apparatus which facilitates the adjustment of the cover. More particularly, the inventive apparatus permits the vertical adjustment of the cover of, for example, a conveyor, such as an air facilitated conveyor.

Elongated devices such as conveyors often utilize protective covers thereon, either to prevent damage to the objects contained on the device from materials striking them from above or, more commonly, to maintain the objects on the elongated device. For instance, certain conveyors are designed to convey objects such as empty cans being transported to a filling station or the like on a moving bed of air. Because in such instances the untilled cans being conveyed are literally floating on the bed of air, it is possible for one or more of the cans being conveyed to tip or fall over, thereby causing blockages in the conveyor. When this happens, the operator often has to stop the conveyor and completely empty it of its contents to find the overturned can. This can be extremely time consuming and severely compromises the efficiency of the air conveyor apparatus.

In order to help prevent the overturning of cans during the air conveyor operation, the air conveyor can be provided with a cover which is arrayed over the cans as they are being conveyed, at a height which permits upright cans to pass thereunder yet which is set at a level above the cans so as to prevent cans from being lifted high enough to trip or turn over. Typically the cover is perforated to permit air to pass therethrough.

Such covers are generally supported by brackets on either side which are bolted or otherwise connected to the sides or other areas of the air conveyor at regular intervals along the length of the conveyor. When it is desired to adjust the air conveyor to convey cans or other objects having a different size or height than the objects currently being conveyed, the height of the cover must be adjusted to take into account the height of the new objects to be conveyed. Since air conveyor systems can be extremely long, i.e., 80 feet in length or longer, adjusting the height of the cover can often require the loosening, adjusting and tightening of over 100 different bolts on the various brackets holding the cover, while simultaneously supporting the cover in position. This can often require several man-hours of work simply to provide for a change in the height of the object being conveyed. If a production schedule requires several such changeovers per week, the time required to change the cover height on a conveyor can be a serious drain on resources and create much down-time for the conveyor.

What is desired therefore is a system which facilitates the adjustment of the cover height of a conveyor or other elongated apparatus without the down-time and inefficiency of current methods.

SUMMARY OF THE INVENTION

It is an object of the present invention to provide a vertically adjustable cover for an elongated device, and an apparatus for simply and easily adjusting the vertical height of the cover.

It is a further object of the present invention to provide an apparatus whereby the cover of an elongated device can be adjusted in a single step.

It is another object of the present invention to provide an apparatus whereby the cover of an air conveyor can be adjusted to accommodate different conveyed object heights via a single operation.

It is still another object of the present invention to provide an apparatus whereby the change over from one object height to another in an air conveyor can be accomplished in far less time it takes to change the height of the cover in a conventional air conveyor.

These objects and others which will become apparent to the artisan upon review of the following description can be accomplished by providing an apparatus for adjusting the height of the cover of an elongated device, which includes a mounting structure associated with the elongated device, for mounting a cover over the device. The mounting structure has a plurality of successively arrayed substantially vertical supports and a plurality of slidable mounts, each of the mounts being slidably positioned on one of the supports. The cover for the elongated device (or one or more brackets for supporting the cover) is attached to the mounts so as to at least partially cover the top of the elongated device, yet be adjustable in height by sliding the mounts along the vertical supports.

The apparatus also includes a plurality of successively arrayed adjustment levers. Each adjustment lever has two arms and a fulcrum point about which the adjustment lever pivots. A first or upper arm of each of the adjustment levers is operatively connected to one of the mounts and a second or lower arm of each of the adjustment levers is operatively connected to at least one successive adjustment lever, such that displacement of the second arm of one of the adjustment levers (i.e., by pivoting the adjustment lever about its fulcrum point) results in displacement of the second arm of the successive adjustment lever. Therefore when the second arms of successive adjustment levers are displaced, the first arm of each of the adjustment levers is correspondingly displaced by rotation of the adjustment lever about its fulcrum point, which changes the vertical displacement of the mounts to which the adjustment levers are connected and thereby changes the height of the cover disposed over the top of the elongated device.

BRIEF DESCRIPTION OF THE FIGURES

The present invention will be better understood and its advantages more apparent in view of the following detailed description, especially when read with reference to the appended drawings, as follows.

DISCLOSURE OF THE INVENTION

Figure 1:
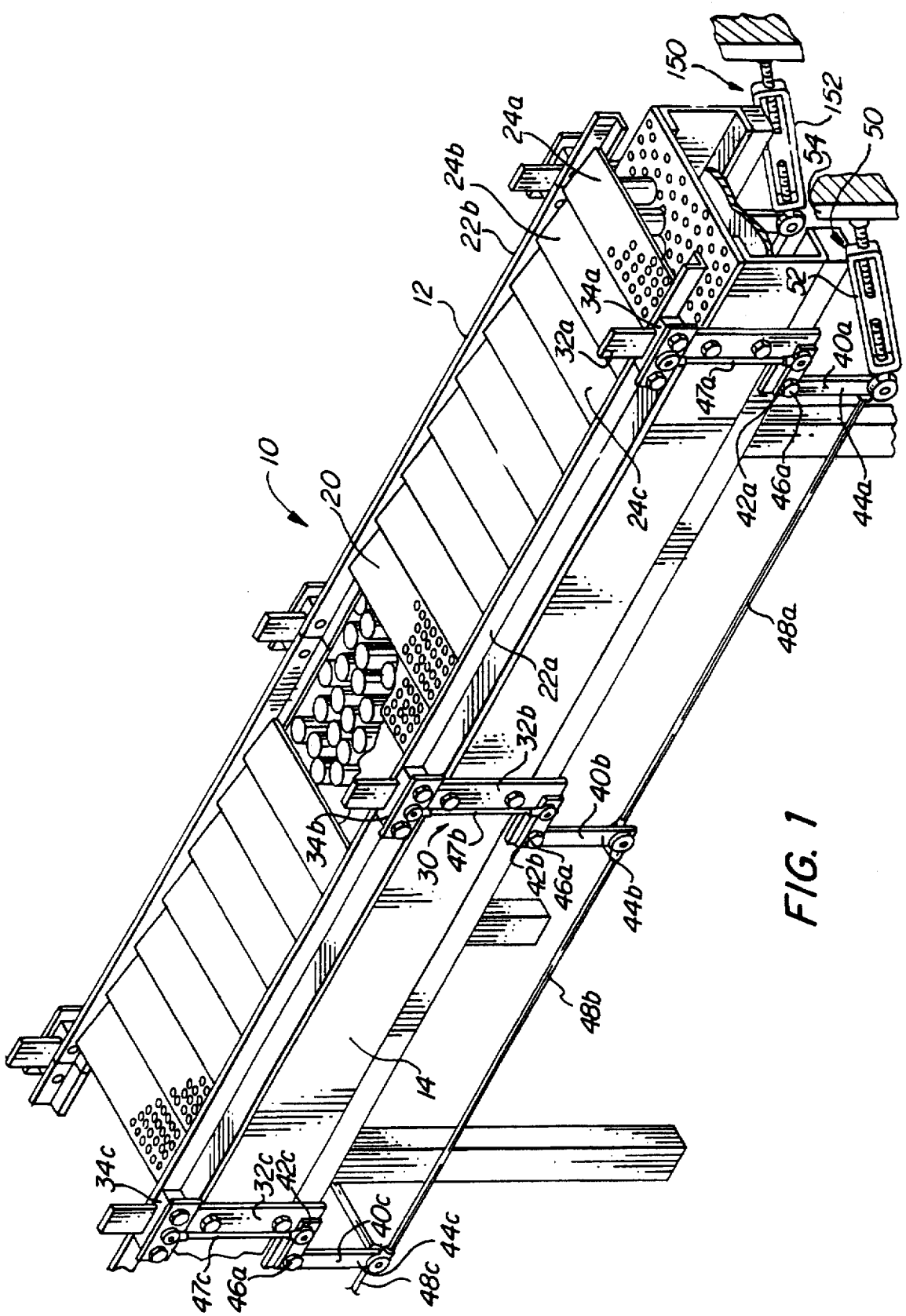
FIG. 1 is a partially broken-away perspective view of a conveyor in accordance with the present invention.

Referring to the drawings in detail, an elongated device having a vertically adjustable cover therefor, along with an apparatus for facilitating the vertical adjustment of the cover, constructed in accordance with the present invention, is shown and generally designated by the reference numeral 10. It should be noted that for the sake of clarity all the components and parts of device 10 may not be shown and/or marked in all the drawings. Also, as used in this description, the terms "up" "down" "top" "bottom", etc. refer to device 10 when in the orientation illustrated in FIG. 1. Furthermore as used in this description the term "front"

refers to the terminus of travel of objects being conveyed along device 10 and "back" refers to the starting point of those objects entering device 10.

Although this description is written in terms of a conveyor, more specifically an air conveyor, for conveying empty cans to a filling station, such description is for convenience only. It should be understood that the present invention applies to any elongated device for which a cover having a vertically adjustable height is desired or necessary.

As illustrated in FIG. 1, elongated device 10 comprises an elongated system which extends along a certain path. For instance, the elongated system may be a conveyor such as an air conveyor 12, which extends along a straight or curved path. Conventional conveyor or air conveyor systems can be of varying lengths and can extend 50 feet, 80 feet, or even longer in length. A typical air conveyor is an elongated rectangular box plenum 14 having holes formed in the top thereof. Objects such as empty cans can be conveyed on this top surface, maintained in place on the sides by guide rails (not shown) and on the top by a perforated plate cover 20. Air is forced into the plenum via fans (not shown) and the air blows out of the holes, with the result that the objects to be conveyed lift off the surface of plenum 14 and are conveyed in the direction of air flow in a reduced friction manner the full length of plenum 14. The perforated cover 20 keeps the objects from lifting high enough to turn over and accordingly must be set at a height corresponding to the height of the objects being conveyed. More specifically, cover 20 must be set at a height sufficient to permit the cans to pass thereunder unimpeded, be not so high as to permit one or more of the cans to tip or fall over.

Cover 20 which is used to cover conveyor 12 of the present invention can take many forms, provided it covers substantially along the length and across the width of plenum 14, along which objects are to be conveyed. Cover 20 can merely be a perforated sheet which extends along and across plenum 14. Most preferably, however, cover 20 comprises a pair of elongated shelves or brackets 22a and 22b, each of which extend along the length of plenum 14 on either side thereof, with individual cover plates 24a, 24b, 24c ..., etc. lying on each of shelves 22a and 22b to thereby cover plenum 14. Most preferably each cover plate 24a, 24b, 24c ..., etc. overlaps with the next successive cover plate as illustrated in FIG. 2, such as by the agency of bolt 26, to reduce the possibility of objects being conveyed along conveyor 10 catching an edge of a cover plate 24 and blocking conveyor 12.

Figure 2:
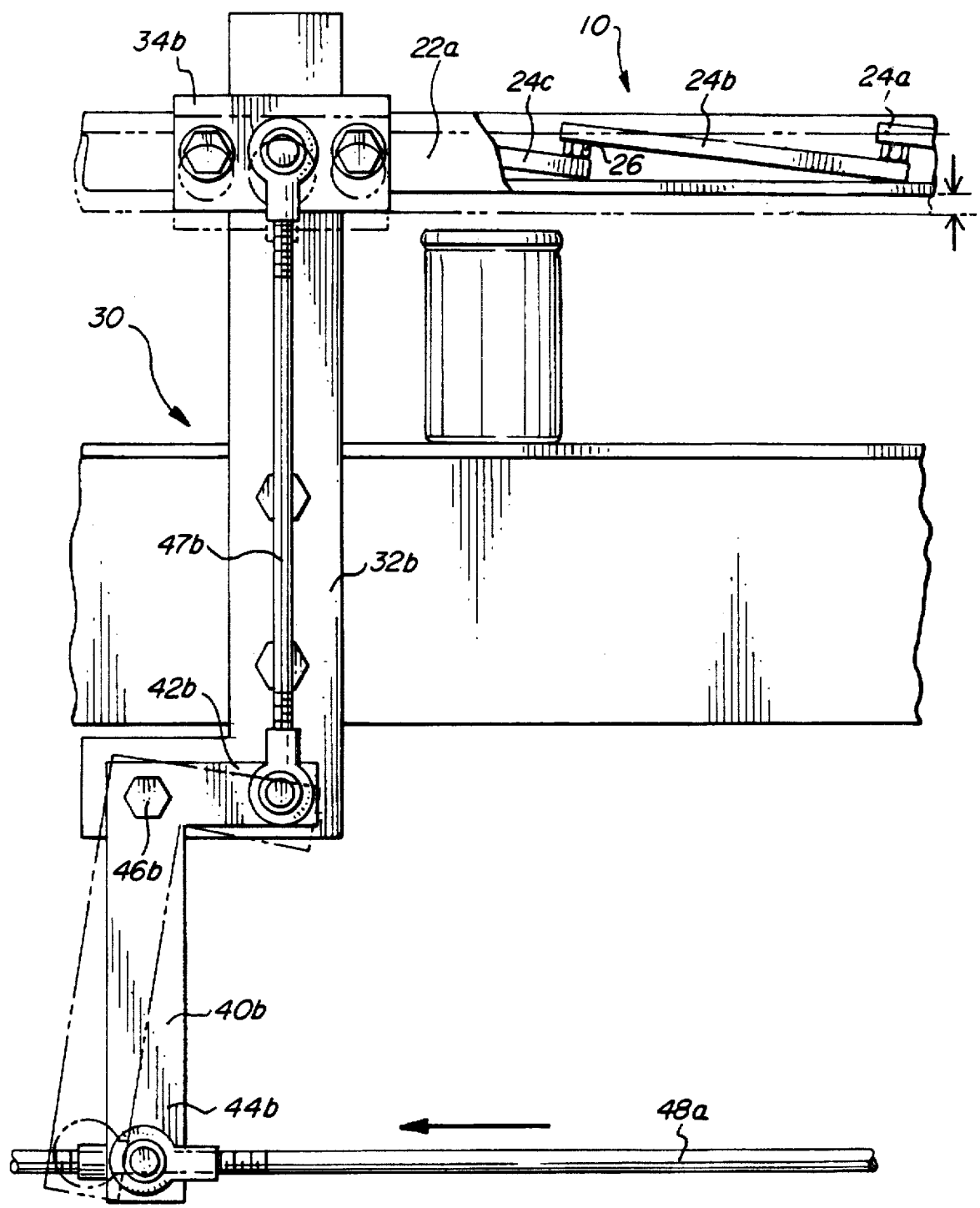
FIG. 2 is a partially broken-away side plan view of the conveyor of FIG. 1, showing in phantom displacement of the inventive mounting structure.

Conveyor 12 has associated therewith a mounting structure 30 for mounting and vertically adjusting cover 20 thereover, as shown in FIGS. 1 and 2. Mounting structure 30 includes a plurality of successively arrayed substantially vertical supports 32a, 32b, 32c ..., etc. Supports 32a, 32b, 32c ..., etc. are mounted to the sides of conveyor 12 along its length at intervals which can vary between about 2 feet and about 10 feet, but are most preferably mounted at intervals of about 4 feet to about 7 feet along conveyor 12. Vertical supports 32a, 32b, 32c ..., etc. can comprise any suitable means for performing the functions hereinafter described, such as rods. Advantageously, vertical supports 32a, 32b, 32c ..., etc. can comprise bars for the additional structural integrity provided by bar-shaped objects as compared to rods. Vertical supports 32a, 32b, 32c ..., etc. are mounted to and extend above the top of plenum 14 and extend at least as high as the highest height desired or necessary for cover 20.

Vertical supports 32a, 32b, 32c ..., etc. can be made of any material having the sufficient dimensional stability and structural integrity to, collectively, maintain cover 20 in position. Typically, vertical supports 32a, 32b, 32c ..., etc. are made of a metal such as iron, steel or aluminum, or they can be a high density plastic such as high density polyethylene (HDPE). In addition, vertical supports can be coated with a nonslip or friction-reducing coating such as polytetrafluoroethylene (PTFE or Teflon™) to reduce the friction of objects sliding therealong as will be explained in more detail hereinbelow. Indeed, vertical supports can be made entirely of PTFE if so desired.

Mounting structure 30 for mounting cover 20 on air conveyor 12 also comprises a plurality of slidable mounts 34a, 34b, 34c ..., etc., each mount 34a, 34b, 34c ..., etc. being slidably positioned on one of the vertical supports 32a, 32b, 32c ..., etc. Each of slidable mounts 34a, 34b, 34c ..., etc. extend about each of vertical supports 32a, 32b, 32c ..., etc. respectively, so as to permit slidable mounts 34a, 34b, 34c ..., etc. to slide up and down along vertical supports 32a, 32b, 32c ..., etc. Cover 20 (and especially shelves 22a and 22b) is bolted or otherwise attached to mounts 34a, 34b, 34c ..., etc. such that as mounts 34a, 34b, 34c ..., etc. slide along vertical supports 32a, 32b, 32c ..., etc., cover 20 moves therealong and is thereby raised and lowered in height. Slidable mounts 32a, 32b, 32c ..., etc can be formed of any material having the desired structural strength and integrity, and are preferably a metal or high density plastic, optimally coated with PTFE.

Device 10 of the present invention also comprises a plurality of successively arrayed adjustment levers 40a, 40b, 40c ..., etc. (also preferably formed of metal or high density plastic). Each adjustment lever 40a, 40b, 40c ..., etc. has an upper arm 42a, 42b, 42c ..., etc. and a lower arm 44a, 44b, 44c ..., etc., as well as a fulcrum point 46a, 46b, 46c ..., etc. about which each adjustment lever 40a, 40b, 40c ..., etc. can be pivoted. Fulcrum point 46a, 46b, 46c ..., etc. of each arm is operatively connected in rotatable fashion to conveyor 12 such that each adjustment lever 40a, 40b, 40c ..., etc. pivots about fulcrum point. Most preferably each fulcrum point 46a, 46b, 46c ..., etc. is rotatably connected to a lower portion of each vertical support 32a, 32b, 32c ..., etc., such as by journaling a rod in each fulcrum point 46a, 46b, 46c ..., etc. and the lower portion of vertical support 32a, 32b, 32c ..., etc. Upper arm 42a, 42b, 42c ..., etc. of each of adjustment levers 40a, 40b, 40c ..., etc. is operatively connected (either directly or indirectly) to one of mounts 34a, 34b, 34c ..., etc. slidably mounted on each vertical support 32a, 32b, 32c ..., etc. Most preferably, because of the distances involved, upper arm 42a, 42b, 42c ..., etc. of each adjustment lever 40a, 40b, 40c ..., etc. is operatively connected to each mount 34a, 34b, 34c ..., etc. by connection through a push rod 47a, 47b, 47c ..., etc. (such as a metal rod) or other apparatus such that movement of upper arm 42a, 42b, 42c ..., etc. causes up and down movement of the mount 34a, 34b, 34c ..., etc. to which it is connected. In this manner, rotation of each adjustment lever 40a, 40b, 40c ..., etc. about its fulcrum point causes a change in the height of the mount 34a, 34b, 34c ..., etc. to which the adjustment lever 40a, 40b, 40c ..., etc. is attached along vertical support 32a, 32b, 32c ..., etc., and thus a change in height in cover 20 which is mounted to mounts 34a, 34b, 34c . . . , etc. being displaced vertically.

Lower arm 44a, 44b, 44c . . . , etc. of each of adjustment levers 40a, 40b, 40c . . . , etc. is operatively connected to at least one successive adjustment lever 40a, 40b, 40c . . . , etc., preferably by a connecting rod 48a, 48b, 48c . . . , etc. or other like means. In this manner, displacement of the lower arm 44a of one adjustment lever 40a (and displacement of upper arm 42a resulting change in vertical displacement of mount 34a to which it is attached, and cover 20) results in displacement of the lower arm 44b of the successive adjustment lever 40b to which it is connected (and, therefore, displacement of upper arm 42b, causing adjustment of the vertical displacement of the mount 34b to which adjustment lever 40b is connected, and change in height of the cover 20).

Indeed, each adjustment lever 40b, 40c . . . , etc., with the exception of the first adjustment lever 40a at the front of device 10 and the last adjustment lever (not shown) at the back of device 10, are connected to the successive adjustment levers on either side of it, such that all adjustment levers 40a, 40b, 40c . . . , etc. are operatively connected along the length of conveyor 12. As there are a plurality of adjustment levers 40a, 40b, 40c . . . , etc. extending successively along the length of conveyor 12, therefore, vertical displacement of lower arm 44a of adjustment lever 40a, or any of adjustment levers 40a, 40b, 40c . . . , etc., causes displacement of second arm of each adjustment lever, such that each mount 34a, 34b, 34c . . . , etc. to which adjustment levers 40a, 40b, 40c . . . , etc. successively arrayed along conveyor 12 are operatively connected through upper arm 42a, 42b, 42c . . . , etc. are vertically displaced, thereby raising the entire cover 20. In this manner vertical displacement of the second arm 44a of one of the adjustment levers 40a, changes the height of the cover 20 along the entire length of conveyor 12 thus eliminating the need to make individual adjustments in order to adjust the eight of cover 20 along the length of conveyor 12.

Desirably, a displacement means 50 is provided for displacing second arm 44a of adjustment levers 40a, such that the second arms 44a, 44b, 44c . . . , etc. of all adjustment levers 40a, 40b, 40c . . . , etc. are correspondingly displaced and cover 20 is raised along the length of conveyor 12. Such a displacement means 50 can comprise, for instance, a turnbuckle 52 which is mounted on one end to an immovable object such as a wall 54 and at its other end either directly or through a connecting rod (not shown) to lower end 44a of adjustment lever 40a. In this manner, adjustment of the length of turnbuckle 52 causes displacement of lower arm 44a of adjustment lever 40a to which it is connected and corresponding displacement of the second arms 44b, 44c . . . , etc. of each successive adjustment lever 40b, 40c . . . , etc. thereby changing the height of cover 20 by the mere act of adjusting turnbuckle 52. Of course, it will be recognized that displacement means 50 can be positioned so as to displace any of adjustment levers 40a, 40b, 40c . . . , etc. in order to adjust the height of cover 20.

Although it is possible to array vertical supports 32a, 32b, 32c . . . , etc., adjustment levers 40a, 40b, 40c . . . , etc., and mounting joints 34a, 34b, 34c . . . , etc. along one side of conveyor 12 and thereby, through the stiffness of cover 20 raise cover 20 across its width by adjusting adjustment levers 40a, 40b, 40c . . . , etc. on one side of conveyor only, this is not considered advantageous because of the stresses applied to cover 20 by using it in this manner.

What is desired is that mounting structure 30 be arrayed along one side of conveyor 12 and a complementary mounting structure 130, including vertical supports 132a, 132b, 132c . . . , etc., adjustment levers 140a, 140b, 140c . . . , etc. and slidable mounts 134a, 134b, 134c . . . , etc. be arrayed along the second side of conveyor in a complimentary fashion to those on the first side of the conveyor, such that slidable mounts 134a, 134b, 134c . . . , etc. on the second side of conveyor 12 are vertically displaced in the same manner as those on the first side of conveyor 12 so as to raise both sides of cover 20 (i.e., both shelves 22a and 22b) to the same height successive adjustment levers 140a, 140b, 140c . . . , etc. being operatively connected by connecting rods 148a, 148b, 148c . . . , etc. This can be done by providing for the displacement of the lower arm 144a, 144b, 144c . . . , etc. of adjustment levers 140a, 140b, 140c . . . , etc. on the second side of conveyor 12 the same distance as the displacement of lower arms 44a, 44b, 44c . . . , etc. on the first side of conveyor 12 such as, by providing a second displacement means 150 (such as turnbuckle 152) connected to one of the lower arms 144a, 144b, 144c . . . , etc. of adjustment levers 140a, 140b, 140c . . . , etc. on the second side of conveyor 12.

Figure 3:
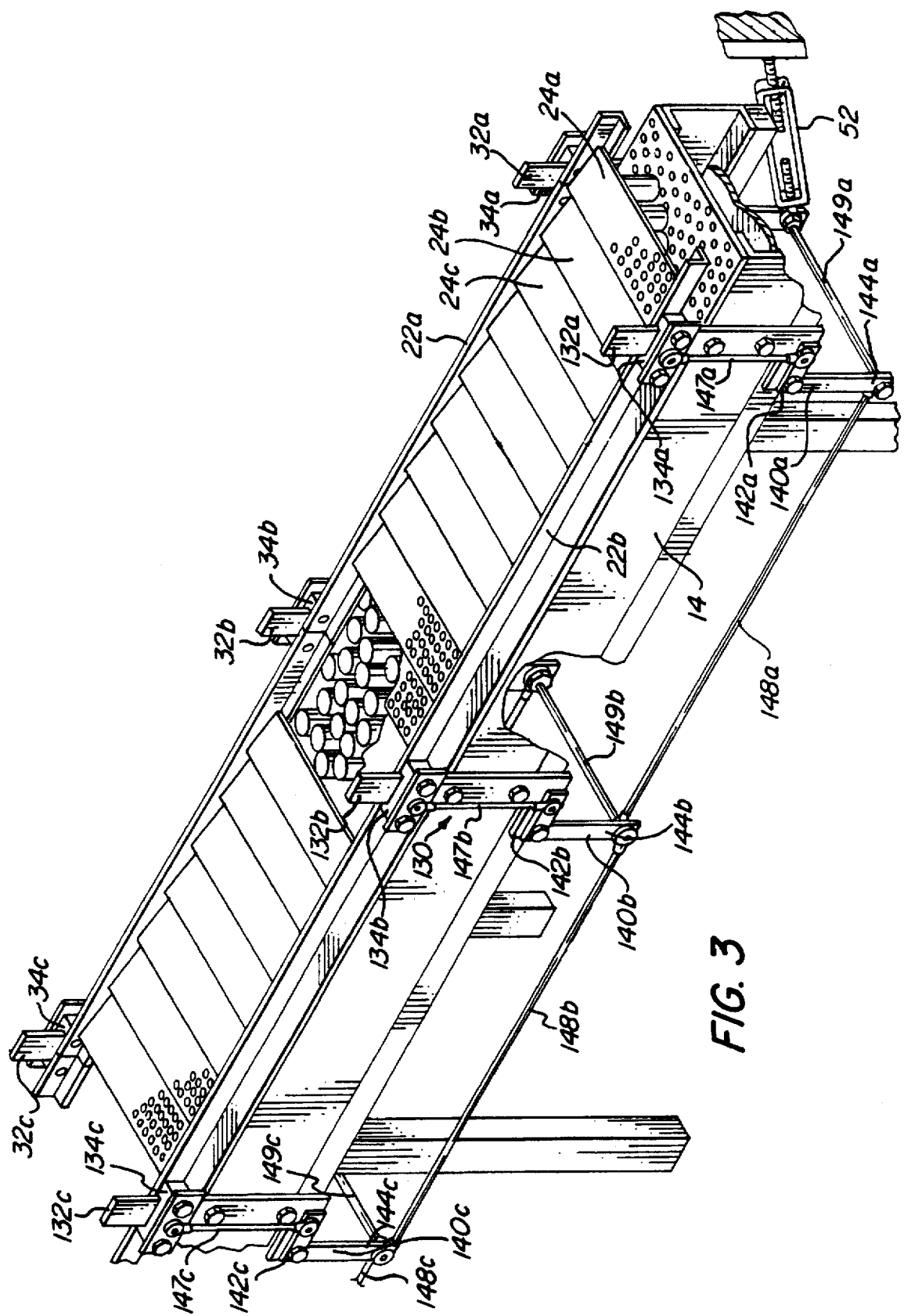
FIG. 3 is a partially broken-away perspective view of the conveyor of FIG. 1, showing the inventive mounting structure on either side of the conveyor, and interconnected.

Most preferably, however, in order to insure that the vertical displacement of mounts 134a, 134b, 134c . . . , etc. on the second side of conveyor 12 is the same as that on the first side of conveyor 12, and to provide for adjustment of the height of cover 20 on both sides of conveyor 12 in one operation (one adjustment of a single turnbuckle 52 for instance), one or more of adjustment levers 40a, 40b, 40c . . . , etc. can be operatively connected with adjustment levers 140a, 140b, 140c . . . , etc. For instance a displacement rod or other like means 149a, 149b, 149c . . . , etc. journaled in lower arm 44a, 44b, 44c . . . , etc. of one or more, and preferably all, of adjustment levers 40a, 40b, 40c . . . , etc. on one side of the conveyor can be extended and be journaled in to the lower arm 144a, 144b, 144c . . . , etc. of the corresponding adjustment arm 140a, 140b, 140c . . . , etc. such that displacement of the adjustment levers 40a, 40b, 40c . . . , etc. on the first side of conveyor 12 causes displacement of adjustment levers 140a, 140b, 140c . . . , etc. on the second side of conveyor 12 thus raising the height of cover 20 along both sides of conveyor 12, as well as along its length as illustrated in FIG. 3.

In this manner, adjusting the height of cover 20 of conveyor 12, such as an air conveyor, to provide for the conveying of objects, such as empty cans, of differing heights can be accomplished by a single step, such as the adjustment of a single turnbuckle 52. This can accordingly accomplish in minutes what formerly took several manhours to accomplish, resulting in substantially reduced down-time of conveyor 12 and increased efficiency.

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

Figure 4:
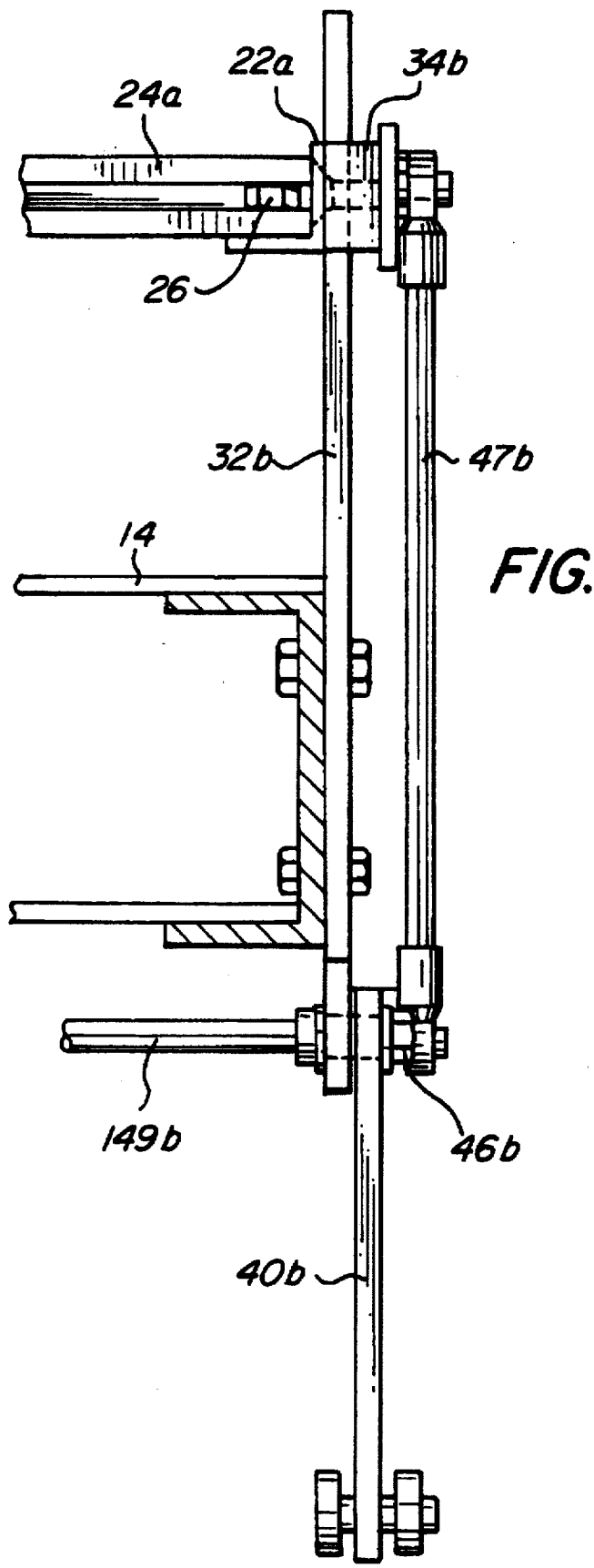
FIG. 4 is a partial cross-sectional view of the conveyor of FIG. 1.

In the alternative, and as illustrated in FIG. 4, displacement rods 149a, 149b, 149c . . . , etc. can be mounted to adjustment levers 40a, 40b, 40c . . . , etc. and 140a, 140b, 140c . . . , etc. at their respective fulcrum points 46a, 46b, 46c . . . , etc. and 146a, 146b, 146c . . . , etc., and rotate in bearings mounted in vertical supports 32a, 32b, 32c . . . , etc. and 132a, 132b, 132c . . . , etc.

Of course, it will be recognized that the use of displacement rods 149a, 149b, 149c . . . , etc. can, if desired, eliminate the need for connecting rods 148a, 148b, 148c . . . , etc.

What is claimed is:

1. An elongated device having an adjustable cover therefor, comprising:
   a. an elongated device having opposing vertical sides and a top portion;
   b. a mounting structure associated with the elongated device, for mounting a cover thereover, the mounting structure comprising a plurality of successively arrayed substantially vertical supports and a plurality of slidable mounts, each slidable mount being slidably positioned on one of the vertical supports;
   c. a cover means attached to each of the slidable mounts so as to at least partially cover the top portion of the elongated device;
   d. a plurality of successively arrayed adjustment levers, each adjustment lever having two arms and a fulcrum point, a first arm of each of the adjustment levers being operatively connected to one of the slidable mounts and a second arm of each of the adjustment levers being operatively connected to the second arm of at least one successive adjustment lever, such that displacement of the second arm of one of the adjustment levers results in displacement of the second arm of at least one successive adjustment lever, and vertical displacement of the slidable mounts to which the adjustment levers are connected.

2. The adjustable apparatus of claim 1 wherein the elongated device comprises a conveyor, for conveying objects in a certain direction.

3. The adjustable apparatus of claim 2 wherein the cover means comprises a pair of elongated rails on which cover plates sit.

4. The adjustable apparatus of claim 3 wherein the cover comprises a plurality of cover elements having a leading edge facing in the direction opposite to the direction of travel of the objects being conveyed, successively disposed between the elongated rails.

5. The adjustable apparatus of claim 4 wherein the cover elements partially overlap with each other.

6. The adjustable apparatus of claim 5 wherein each of the cover elements has a spacer disposed thereon, such that, when overlapping, the leading edge of each successive cover element is raised above the cover element preceding it.

7. The adjustable apparatus of claim 2 wherein the first arm of each of the adjustment levers is attached to one of the slidable mounts via a push rod.

8. The adjustable apparatus of claim 7 wherein the fulcrum point of each of the adjustment levers is rotatably attached to the mounting structure.

9. The adjustable apparatus of claim 8 wherein the second arm of each of the adjustment levers is connected to the second arm of at least one successive adjustment lever via a connecting rod.

10. The adjustable apparatus of claim 2 wherein the second arm of one of the adjustment levers is connected to a displacement means effective to cause the displacement of the second arm of the adjustment lever to which it is connected.

11. The adjustable apparatus of claim 10 wherein the displacement means comprises a turnbuckle.

12. An adjustable apparatus for covering a conveyor, comprising:
   a. a conveyor having opposing vertical sides and a top portion along which objects are transported in a certain direction;
   b. a mounting structure associated with the elongated device, for mounting a cover thereover, the mounting structure comprising a plurality of successively arrayed substantially vertical supports and a plurality of slidable mounts each slidable mount slidably positioned on one of the vertical supports;
   c. a cover means mounted to the slidable mounts so as to at least partially cover the top portion of the elongated device;
   d. a plurality of successively arrayed adjustment levers, each adjustment lever having two arms, a first arm of each of the adjustment levers being operatively connected to one of the slidable mounts and a second arm of each of the adjustment levers being operatively connected to at least one other adjustment lever, such that displacement of the second arm of one of the adjustment levers results in displacement of the second arm of each adjustment lever to which it is operatively connected.

13. The adjustable apparatus of claim 12 wherein the elongated device comprises an air conveyor, for conveying objects along a bed of air in a certain direction.

14. The adjustable apparatus of claim 12 wherein the cover means comprises a pair of elongated rails on which the cover sits.

15. The adjustable apparatus of claim 14 wherein the cover comprises a plurality of cover elements having a leading edge facing in the direction opposite to the direction of travel of the objects being conveyed, successively disposed between the elongated rails.

16. The adjustable apparatus of claim 12 wherein the first arm of each of the adjustment levers is attached to one of the slidable mounts through a push rod.

17. The adjustable apparatus of claim 12 wherein the second arm of each of the adjustment levers is operatively connected to the second arm of at least one successive adjustment lever, such that displacement of the second arm of one of the adjustment levers results in displacement of the second arm of each successive adjustment lever, and vertical adjustment of each of the slidable mounts.

18. The adjustable apparatus of claim 17 wherein the second arm of each of the adjustment levers is connected to the second arm of at least one successive adjustment lever via a connecting rod.

19. The adjustable apparatus of claim 18 wherein the second arm of one of the adjustment levers is connected to a displacement means effective to cause the displacement of the second arm of the adjustment lever to which it is connected.

20. The adjustable apparatus of claim 19 wherein the displacement means comprises a turnbuckle.

* * * * *